United States Patent

[11] 3,585,968

| [72] | Inventor | William Stone, Jr.<br>1434 Comstock Ave., Los Angeles, Calif. 90024 |
|---|---|---|
| [21] | Appl. No. | 829,031 |
| [22] | Filed | May 29, 1969 |
| [45] | Patented | June 22, 1971 |

[54] RACK FOR AUTOMATIC CARE OF LABORATORY ANIMALS
10 Claims, 5 Drawing Figs.

[52] U.S. Cl. .................................................. 119/22, 119/18
[51] Int. Cl. ....................................................A01k 01/02, A01k 31/00
[50] Field of Search ........................................ 119/17, 18, 22

[56] References Cited
UNITED STATES PATENTS

| 2,565,521 | 8/1951 | Ratermann............... | 119/22 |
| 2,983,251 | 5/1961 | Lingis........................... | 119/17 |
| 3,214,030 | 10/1965 | Graham et al. ............... | 119/18 X |
| 3,270,713 | 9/1966 | Rubricius..................... | 119/17 |
| 3,385,266 | 5/1968 | Launder et al................ | 119/22 |
| 3,463,123 | 8/1969 | Hoeltge......................... | 119/22 X |
| 3,464,389 | 9/1969 | Seiderman.................... | 119/22 |

*Primary Examiner*—Hugh R. Chamblee
*Attorney*—Thomas D. Linton, Jr.

ABSTRACT: An improved rack is provided for removably supporting a battery of animal cages and which may include, for example, means for providing drinking water in each cage; and which also includes a moveable membrane, plastic sheet, or the like, which is drawn under each row of cages in the rack for receiving droppings from the cages. The sheet is drawn along a path under the row of cages from a reel on one side of the cages to a reel on the other side. When the sheet becomes completely reeled on the latter reel, it may be removed and disposed.

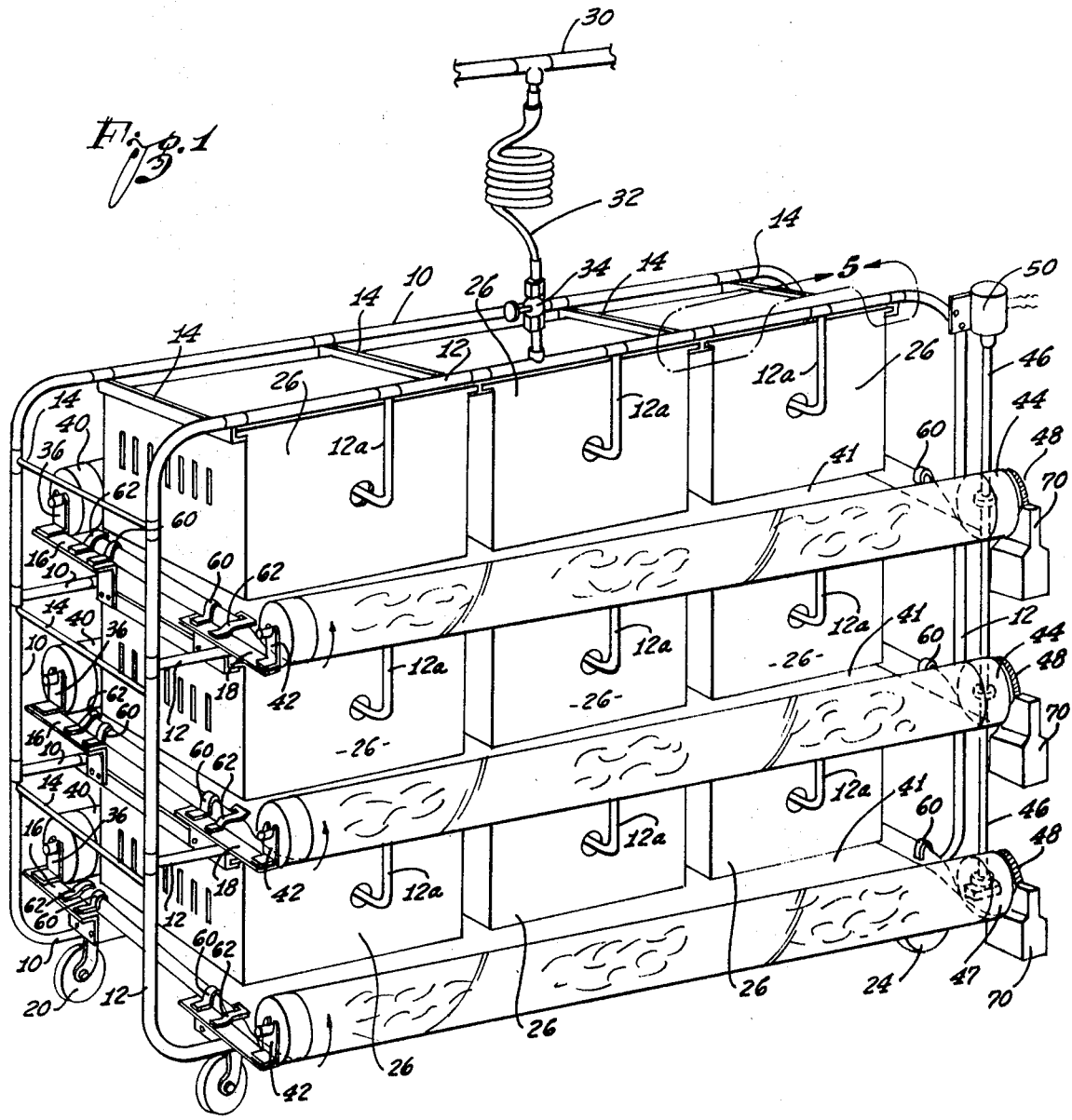

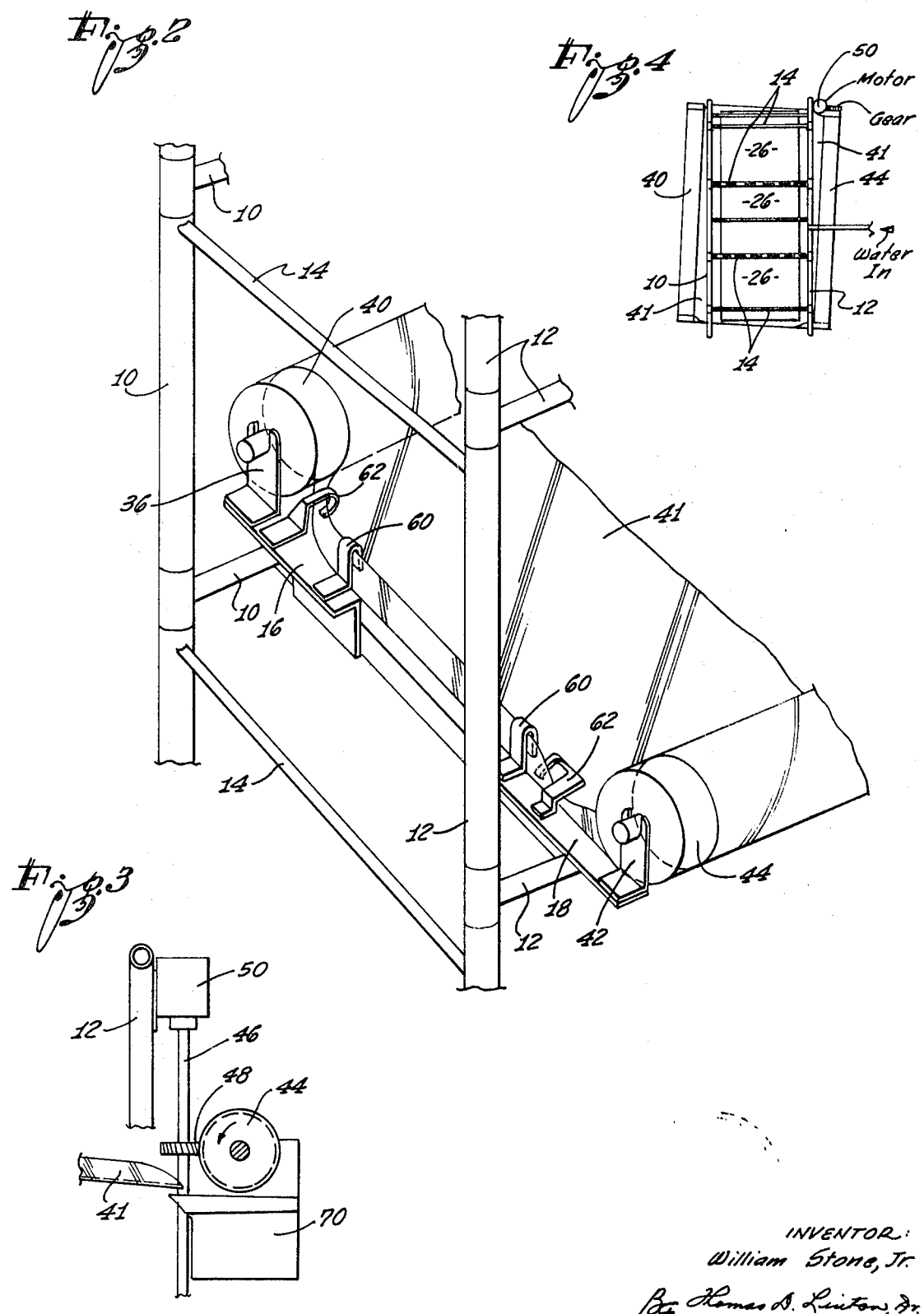

RACK FOR AUTOMATIC CARE OF LABORATORY ANIMALS

BACKGROUND OF THE INVENTION

The present invention is concerned with animal husbandry and especially with the care and maintenance of animals for research purposes. It is most important in research, that the animals being treated be maintained in a sanitary condition, since the results of the research often depend upon the prevention of the spread of disease among the animals. Moreover, the illness or death of the animals from extraneous causes could completely nullify a research project after much time, effort and money had been expended thereon.

The present invention is concerned primarily with an improved rack for supporting a battery of animal cages in, for example, multiple rows, and which provides for the rapid removal and disposal of the droppings from the cages.

Two main types of cage structures for the collection and removal of animal wastes are known to the art. The first is the individual tray under the wire mesh of each cage which supports the animal and through which the excreta and other refuse drop. The second type is the longitudinally disposed paper, cardboard, or other support material disposed as an endless conveyor belt, which passes the excreta under more than one cage in series as the support material is removed. However, a problem which is encountered with most prior art devices of this general type is that of maintaining the trays or belts in a clean condition, and of assuring that the refuse does not accumulate so as to constitute a health hazard to the animals. Another problem is that of minimizing as much as possible the unpleasant odors normally generated by the refuse.

In apparatus known to those skilled in this art, a disposable membrane is rotatably mounted at one end of a frame which supports a plurality of cages over the membrane. The membrane forms a parted sleeve around a fixed member across which membrane is drawn. as it collects the animal droppings from the cages. The membrane then continues its travel beyond the cages and supporting structure and discharges the droppings into a refuse collector. The refuse collector may be positioned adjacent the cages, or even outside of the building in which the cages are located.

The assembly and structure of the present invention constitutes a further considerable improvement in the solution of the problem of the reduction of bacterial and other cross-infection from cage to cage, and thus from animal to animal, over the apparatus known to those skilled in this art. A waterproof sheet or membrane is drawn, for example, from a supply reel releasably mounted on one side of the cage to a takeup reel which is releasably mounted on the other side of the same cage. The sheet is drawn along a path which extends transversely rather than longitudinally under one or a row of cages, so that the droppings be collected BY the sheet as it is reeled from one reel to the other, and so that the droppings will not be under more than one cage so as to prevent infection spreading from cage to cage. The transverse movement of the sheet also provides for a short exposure path and time for the excreta, hair, etc., on the sheet. This reduces the overall reservoir of hair, excreta and other refuse in unit time and thus also reduces the opportunity for cross-infection from airborne conveyance of bacteria attached to dirt, hair and excreta from cage to cage. After the sheet has been completely reeled on the takeup reel, it may be subsequently removed and disposed of or cleaned. The drive of the reel is preferably a motor which is intermittently or continuously energized, so as to have an intermittent or continuous movement of the sheet under the cages.

The aforesaid sheet may, for example, be composed of a plastic material such as heavy polyethylene, polypropylene, or a Teflon coated material, for example, or any other suitable material. As will be described, contouring supports are mounted on the frame of the rock for forming the sheet into a transverse trough, as it is drawn under the cages. The transverse trough traps the excreta within it, preventing escape to the cages or shelf, if one is used, below.

A longitudinal trough is formed immediately prior to the takeup roll, by the natural movement of the material in its transverse path. This longitudinal trough is slanted downward to direct the liquid excreta to a removable container or a fixed drain at the low end of this trough.

Alternatively or along with the slant trough, an absorbent material may be rolled inside, attached to, or made a part of the waterproof material. This absorbs and localizes liquid excreta and may with specific animal species, obviate the necessity for the removable container or drain. The absorbent material may be treated with, antibacterial, antifungicidal, antiparasitic, deodorizing agents to aid in the control of such organisms, reduction of gas production and odor control.

The rack is made so that it can be adapted to nearly any size of animal cage which is presently in use. This will make it possible for the research institution user, etc., to utilize his presently owned cages in this semiautomatic, allpurpose frame.

BRIEF DESCRIPTION OF THE DRAWINGS

FIG. 1 is a perspective representation showing one embodiment of the rack of the present invention, by means of which several tiers of cages are supported in individual rows;

FIG. 2 is a fragmentary enlarged view showing a portion of the apparatus of FIG. 1, and specifically showing certain supports which are supported which on the frame of the rack for contouring the aforesaid sheet of material as it is drawn under the cages;

FIG. 3 is another fragmentary representation showing the manner in which a drive mechanism is coupled to a takeup reel included in the rack;

FIG. 4 is a plan view, on a reduced scale with respect to FIG. 1, and showing the interrelation between the various components which make up the rack of the invention; and FIG. 5 is a fragmentary view, on an enlarged scale with respect to FIG. 1, and showing a portion of the rack assembly as designated by the line 5 in FIG. 1.

DETAILED DESCRIPTION OF THE ILLUSTRATED EMBODIMENT

As shown, for example, in FIG. 1, the rack of the present invention includes a framework which may be composed, for example, of a first pipeline 10 and a second pipeline 12. Each of the pipelines may, for example, be bent into a U-shaped configuration, as shown, and they may be spaced apart into a mutual parallel relationship by means of a plurality of brackets 14. Flexible connectors may be used from one frame and bank of cages to another so that a common motor may be used. The motor may be mounted on the ceiling to minimize the chance of electric shock to the animals in the cages.

A pair of support brackets 16 and 18 are mounted on the frame, as shown in FIG. 1, at the lower ends of the respective pipelines 10 and 12. A pair of swivel wheels 20 and 22 are supported by the respective brackets 16 and 18, and similar swivel wheels such as the wheel 24 may be supported at the other corners of the framework. In this way, the framework may conveniently be moved around the room to any desired location therein. The pipelines 10 and 12 include further intermediate segments 10 and 12 which extend respectively between the vertical portions of the pipelines as intermediate transverse members. As shown, a plurality of cages 26 are suspended from the framework by means of brackets, such as the top brackets 14.

The top brackets 14 have an angled configuration, as shown, so that each cage 26 may be slidably received thereby, each cage having an upper lip extending out from the respective sides thereof to be received slidably by the various brackets 14. It will be appreciated that similar brackets 14 extend across the framework to support the intermediate and lower rows of the cages 26, although the latter brackets are hidden in the view of FIG. 1. Each of the brackets 14, may be positioned along the pipe 12 to any point, such that cages 26, of any diameter may be accommodated.

The manner in which the cages 26 are slidably supported on the brackets 14 is further illustrated in the view of FIG. 5. Each of the cages 26 may be provided with a hole in one end, as shown in FIG. 1, and the pipeline 12, for example, may include a plurality of extensions 12a which extend into the holes. Drinking water may be supplied to the pipeline 12, for example, from a water conduit 30 and through a pipeline 32 and valve 34. Any appropriate known device may be mounted on the end of each of the extensions 12a within the individual cages, to be actuated by the animal in the cage whenever the animal wants a drink of water.

Further brackets 16 and 18 are mounted on the framework at intermediate points under the individual rows of cages 26. The brackets 16 each support a further bracket 36, and the latter bracket, together with similar brackets at the other end of the framework (hidden in FIG. 1) removably support respective reels 40. The reels 40 may be considered supply reels, and each contains a roll of an appropriate sheet material 41 composed, for example, of polyethylene, or other suitable material. The sheet material 41, or an absorbent addition material, may be chemically treated if so desired, as mentioned above. Likewise, each of the brackets 18 supports an additional bracket 42 which, together with similar brackets at the other end of the framework, supports respective takeup reels 44 in a removable manner.

The sheet material 41 from each of the supply reels 40 is drawn under the corresponding row of cages 26 and is reeled up on the corresponding takeup reel 44. In each instance, the sheet of material is drawn under the corresponding row of cages and spaced from the underside thereof. The cages have a meshlike, or other type of apertured bottom, so that the droppings and other refuse from the cages falls on the corresponding sheet of material as it is drawn from its supply reel 40 to its takeup reel 44.

The takeup reels 44 may be driven in unison, by means, for example, of an electric or other motor 50, or means. The drive shaft 46 and appropriate worm and pinion gears 48 at the end of each of the reels 44 (FIG. 3). The motor 50 may be intermittently energized by an appropriate timer, so that the sheets 41 are moved intermittently under the various rows of cages. The sheets 41 may also be moved continuously. As the sheets are so moved, the refuse and droppings contained on them is coiled up into the sheet rolled on the takeup reel 44. Periodically, the latter reel may be removed and disposed, and new supply reels and takeup reels may be mounted into the rack apparatus.

The individual brackets 16 and 18 also support further brackets 60 which serve to contour the sides of the corresponding sheets drawn from the supply reel 40 to the takeup reel 44 to provide upturned edges so that the sheets assume a troughlike configuration to assure that the refuse is retained within the confines of the sheets. Further brackets 62 also supported on the brackets 16 and 18 which serve to feed the edges of the sheets from the horizontal position smoothly into the contouring brackets 60, and from the contouring brackets 60 back to the horizontal position to be wound smoothly on the takeup reels 44. Thus the edges of the sheets are initially folded under in a horizontal position on the supply reel, opened up to a vertical position by contouring brackets 60, then folded under to a horizontal position onto the takeup reel 44. These latter brackets are best shown in the representation of FIG. 2.

The various sheets 41 may be supported in the framework so as to be tilted downwardly to the right in FIG. 1, and any liquids may be discharged into gutters 70 which are supported on the framework as shown, and which serve to carry the liquids into any suitable disposal system. Also, the reels 40 and 44 are mounted in an inclined position relative to one another, as shown in FIG. 4, so that the sheet is stretched at the upper end thereof in FIG. 1, and the takeup reel is inclined relative to the sheet 41 being reeled onto it that the refuse is squeezed in a manner that all liquids are urged towards the gutters 70.

The invention provides, therefore, an improved and simplified rack assembly for supporting animal cages, which can be accommodated with ease to any presently used cages at the site of installation, if necessary, and which is equipped with simple and adequate means for assuring a sanitary condition with respect to the cages and to the surrounding environment.

What I claim is:

1. A rack for supporting at least one animal cage removably supporting a plurality of animal cages positioned in rows and tiers, each of said cages having an apertured bottom, said rack including: a pipeline framework which includes a separate pipeline extending into each of said cages; means for introducing drinking water into said pipeline framework; a first support means mounted on said frame in operative relationship with each of said rows for supporting a first reel of a sheet material; second support means mounted on said frame in operative relationship with each of said rows for supporting a second reel which receives the sheet material from said guide reel; and guide means mounted on said frame in operative relationship with each of said rows for guiding said sheet material along a path under the space from the underside of each of said rows of said cage.

2. The combination dined in claim 1 in which said frame includes transverse brackets and in which said cages are suspended on said brackets in slidable relationship therewith.

3. The combination defined in claim 2 in which said brackets can be slidably positioned and thereafter retained in a fixed position so as to accommodate any diameter of presently used animal cages and thus made adaptable to accommodate more than one size animal cage within the same rack structure.

4. The rack defined in claim 1, in which said first and second support means are configured removably to support said first and second reels.

5. The rack defined in claim 1, and which includes a drive mechanism, and means mounted on said frame coupling said drive mechanism to said second reel to cause said sheet to be drawn along said path under said cage.

6. The combination defined in claim 5 wherein the drive mechanism runs within said rack frame structure.

7. The combination defined in claim 1 and which includes a row of animal cages on said rack, and in which said first and second support means are mounted on said frame in a position such that said sheet material is drawn from said first reel to said second reel transversely across said row.

8. The combination defined in claim 1 in which said frame includes a front framework and rear framework and a plurality of interconnecting brackets to adapt said frame for different sizes of animal cages.

9. The combination defined in claim 1 wherein the edges of said sheet are folded under in a substantially horizontal position on said supply reel, are opened up to a substantially vertical position to form a trough, then folded under to a substantially horizontal position on said takeup reel for keeping feces and odors sealed.

10. A rack for providing mounting means for a plurality of animal cages, said rack including: a pipeline framework having a separate pipeline extending into each of said cages; means for accommodating different size animal cages so that more than one size cage may be mounted within said rack structure; an automatic watering system wherein water flows through the pipeline framework of said rack and thus provides water to each animal cage mounted within said rack; and waste removal means mounted within said rack for removing waste passing through the bottom of the cages.